United States Patent [19]

Hurwitz

[11] 4,001,766

[45] Jan. 4, 1977

[54] ACOUSTIC LENS SYSTEM

[75] Inventor: Michael J. Hurwitz, Wilkinsburg, Pa.

[73] Assignee: Westinghouse Electric Corporation, Pittsburgh, Pa.

[22] Filed: Feb. 26, 1975

[21] Appl. No.: 553,403

[52] U.S. Cl. ................................ 340/8 L; 310/8.7; 340/5 H; 350/175 FS

[51] Int. Cl.² ........................................ H04B 13/00

[58] Field of Search ......... 310/8.7; 340/5 MP, 5 H, 340/8 LF, 8 L, 8 R, 9 R, 10 R; 350/175 FS; 181/176

[56] References Cited

UNITED STATES PATENTS

| | | | |
|---|---|---|---|
| 2,827,835 | 3/1958 | Schade | 350/175 FS X |
| 2,989,895 | 6/1961 | Sandback | 350/175 FS |
| 3,429,997 | 2/1969 | Rösner et al. | 350/175 FS X |
| 3,516,734 | 6/1970 | Schmidt | 350/175 FS X |
| 3,776,361 | 12/1973 | Rolle | 340/8 L X |

OTHER PUBLICATIONS

*Refracting Sound Wave*, by Kock and Harvey "The Journal of the Acoustical Soc. of Amer." vol. 21, No. 5, Sept. 1949 pp. 471–481.

*Related Experiments with Sound Waves and Electromagnetic Waves*, by Kock, Proceedings of the IRE vol. 47, No. 7 July 1959, pp. 1192–1201.

*Primary Examiner*—Harold Tudor

*Attorney, Agent, or Firm*—D. Schron

[57] ABSTRACT

An acoustic imaging system utilizing an acoustic lens and a transducer array. A corrector device is placed in front of the transducer array to flatten the image field so as to conform to the surface of the transducer array.

7 Claims, 7 Drawing Figures

ACOUSTIC LENS SYSTEM

BACKGROUND OF THE INVENTION

1. Field of the Invention

The invention in general relates to acoustic imaging systems, and particularly to a system utilizing an acoustic lens.

2. Description of the Prior Art

Acoustic lenses are utilized in underwater imaging systems in view of their capabilities of producing multiple acoustic beams. In general, an object to be viewed is insonified by means of an acoustic transmitter and reflections from points on the target are focused by means of the acoustic lens onto a transducer array. The output signals provided by the transducer array are processed to yield a display representative of the insonified target.

The action of the acoustic lens is such as to focus onto a focal surface occupied by the transducer array. Although the transducer array is generally planar, the lens actually focuses onto a curved focal surface so that with a relatively large field view, for example 15°, the image is out of focus with increasing distance from the lens axis thus causing a severe degradation of the final display.

SUMMARY OF THE INVENTION

The present invention brings the image to a desired surface to conform with the transducer array which, in the most prevalent and easily manufactured form is planar.

This is accomplished by means of a focal surface modifier which is disposed relative to the transducer array in the path of the acoustic energy coming from the acoustic lens to actually cause a modification of the focal surface of the lens.

In the preferred case the modifier includes two or more adjacent elements having different indices of refraction. In such case the curvature requirements are less stringent than for a single element modifier, although a single element modifier could be utilized.

By selection of various curvatures for the elements of the modifier, the focal surface may be modified to conform not only to a planar surface but to any other desired curvature.

DESCRIPTION OF THE PREFERRED EMBODIMENT

Figure 1:
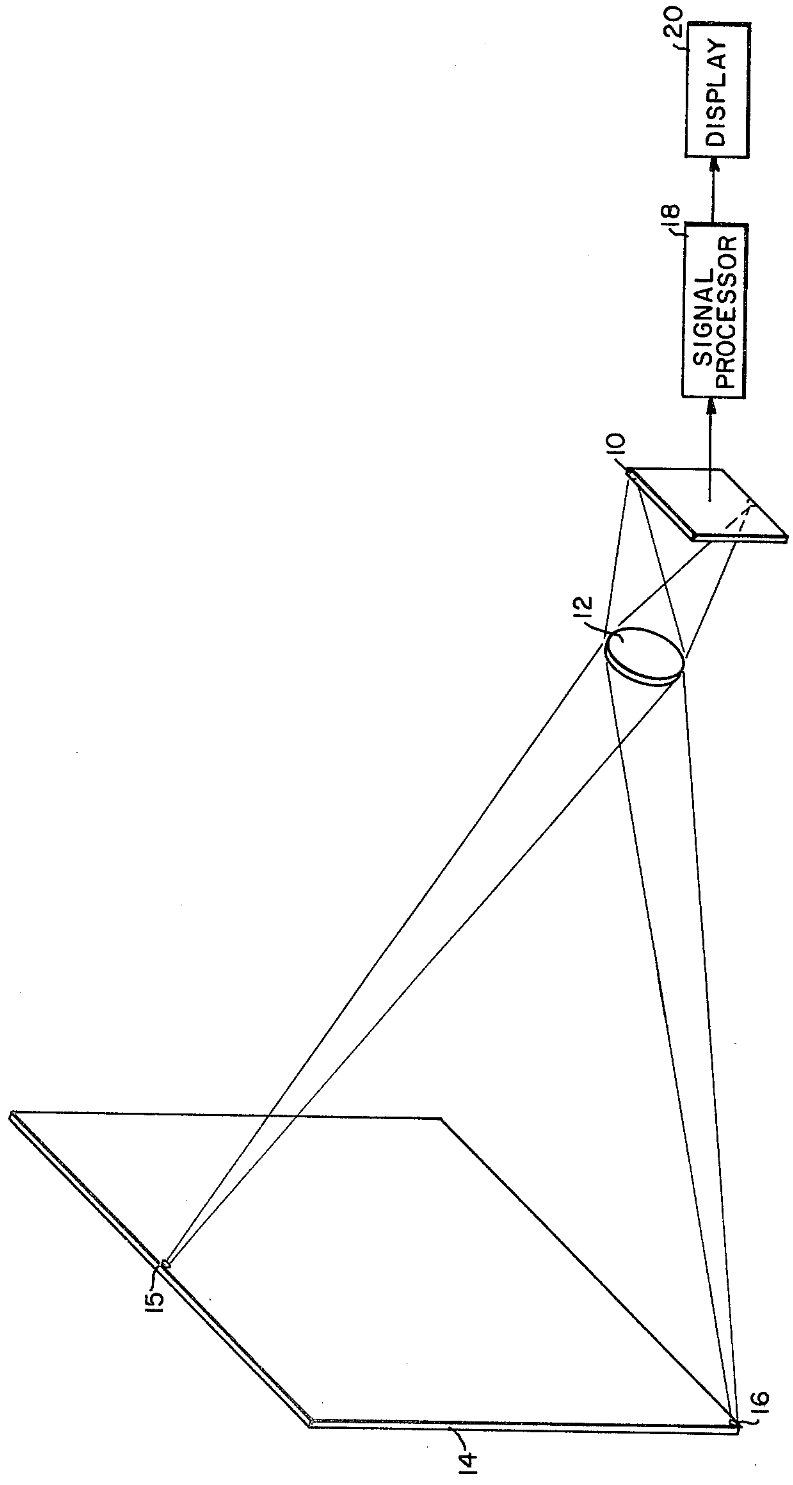
PRIOR ART FIG. 1
FIG. 1 illustrates a typical imaging system of the prior art.

FIG. 1 illustrates a typical acoustic imaging system of the prior art. The system includes a transducer array 10 comprised of either individual transducers or a transducer plate such as in a Sokolov tube. Positioned in front of the transducer array 10 is an acoustic lens 12 which is operable to focus acoustic energy from object points of object plane or surface 14 onto the transducer array 10. Although there are a multiplicity of object points only two, 15 and 16, are illustrated for clarity.

In response to the receipt of acoustic energy, each elemental transducer of the array provides a corresponding output signal indicative of the acoustic energy from its corresponding object point and the transducer signals are processed in signal processor 18. The output of signal processor 18 is fed to the display 20 where the object plane (plus some depth of field) and any target in it are portrayed.

Figure 2:
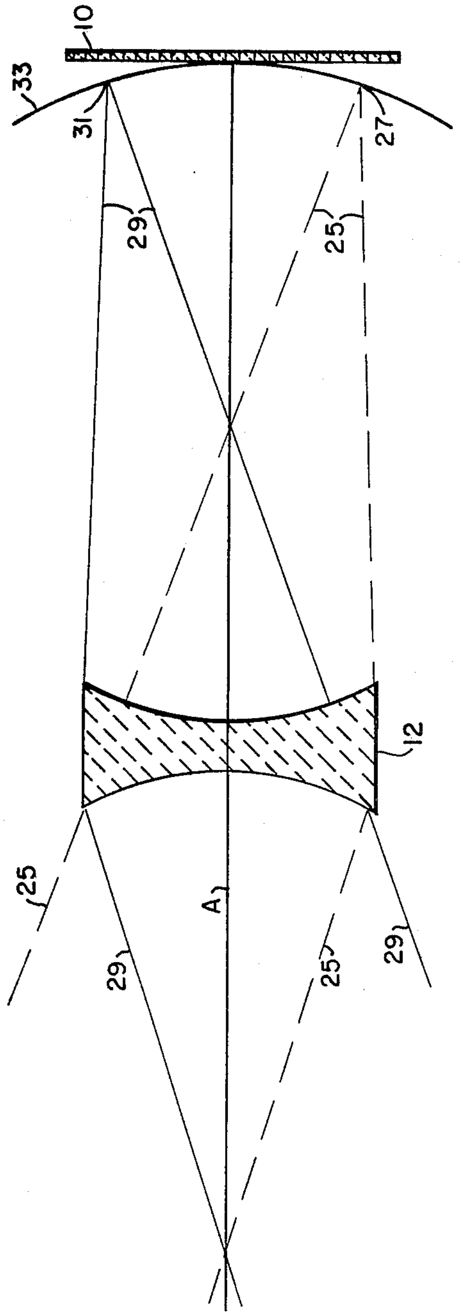
PRIOR ART FIG. 2
FIG. 2 is a side view of a portion of the system of FIG. 1.

FIG. 2 illustrates the focusing action of lens 12 of FIG. 1. The acoustic lens design is analogous to optical lens design except that sound velocity in solids is generally faster than in water so that what would be a diverging lens in optics is a converging lens in acoustics. Accordingly, with lens 12 being of a solid material, its front and rear surfaces are concave. Acoustic energy represented by rays 25 from an object point is brought to a focus at point 27 constituting a focal point. Rays 29, from another object point, are brought to a focus at point 31.

The locus of all these points define a focal surface 33 which is curved and could be approximated as a spherical shape. The transducer array 10 is supposed to be placed at the focal surface of the lens. In FIG. 2, it is seen that the transducer array touches the focal surface at the lens axis A and the distance from the focal surface progressively increases as the off axis distance. This can be partially corrected by laying out the transducers in a spherical array conforming to the focal surface 33, however, it is more convenient to fabricate such transducers as a planar array.

Figure 3:
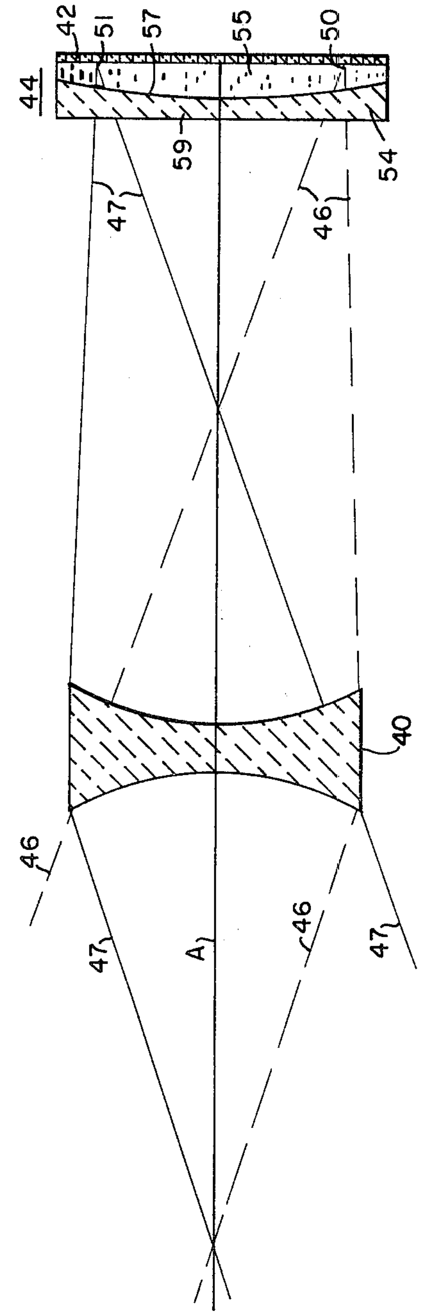
FIG. 3 is similar to FIG. 2 but incorporating the present invention.

FIG. 3, illustrating an embodiment of the present invention, includes an acoustic lens 40 similar to acoustic lens 12 and a transducer array 42 similar to transducer array 10. A focal surface modifier 44 is disposed in the path of acoustic energy passing through the lens, such as illustrated by rays 46 and 47 from two different object points, and is so constructed and arranged as to bring the acoustic energy to respective focal points 50 and 51 on the transducer array 42. The focal surface modifier 44 is operative to speed up, or slow down as the case may be, as a function of the distance from the lens axis A, the acoustic energy so that the locus of all the focal points conforms to the planar transducer array.

Whereas the acoustic energy from an object point impinges upon the entire surface of the lens 40, as evidenced by rays 46, for example this same energy impinges upon a relatively small area of the focal surface modifier 44.

In one embodiment the modifier 44 is comprised of two elements 54 and 55 separated by a curved surface 57 with the materials so chosen and the curved surface so designed as to make acoustic energy impinging on the front surface 59 at elemental areas, appear at the transducer array 42 all at substantially the same time.

Figure 4:
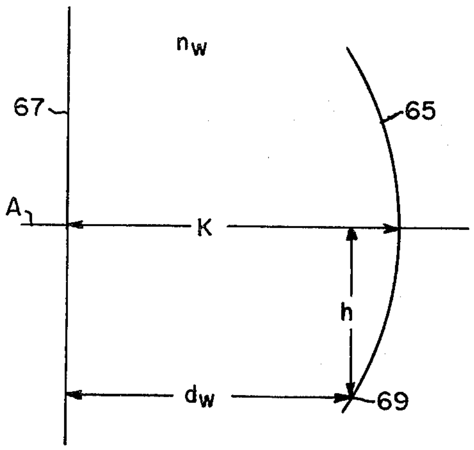
FIG. 4 illustrates a focal surface for the arrangement of FIG. 2, and illustrates certain distances.

The design of a focal surface modifier to accomplish this function will now be explained with reference to FIGS. 4 and 5 and although a two element modifier is described it will be apparent that the principles are applicable to a multi-element modifier with more than two elements. In FIG. 4 surface 65 represents a focal surface which in the present example is assumed to be spherical, and surface 67 represents a reference plane at a distance K from the focal surface as measured along the axis A. The physical distance from the reference plane 67 to a point, such as point 69, on the focal surface 65 is $d_w$ where the distance $d_w$ is a function of $h$, the distance of the point from the axis A.

The acoustic path length to point 69 may be different from the physical path length since the acoustic path length is proportional to the time that it takes an acoustic wave to go through the medium. The acoustic path length is defined as the physical path length times the acoustic index of refraction through which the wave passes. Acoustic index of refraction of a substance is defined as the sound velocity in a reference medium (usually water) divided by the sound velocity in the substance. For the arrangement of FIG. 4, the acoustic path length D between the reference surface 67 and any point on the focal surface 65 is:

$$D = n_w d_w \qquad (1)$$

where $n_w$ is the index of refraction of the medium, assumed to be water. The reference plane 67 can arbitrarily be placed anywhere and the variation of $d_w$ is an indication of the curvature of the focal surface 65.

Figure 5:
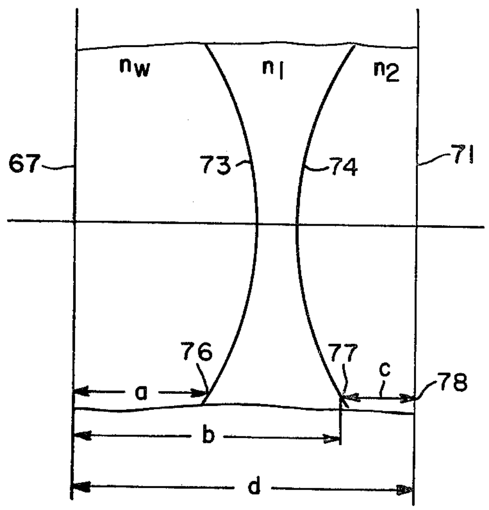
FIG. 5 illustrates the same for FIG. 3.

FIG. 5 illustrates the same reference plane 67 and a desired focal surface 71. Between these planes are three different mediums, the water medium designated by the index of refraction $d_w$, and the mediums of a dual element focal surface modifier, the mediums having respective indices of refraction $n_1$ and $n_2$. Curved surface 73 separates the water from the first element, and curved surface 74 separates the first and second elements.

The physical distance from reference plane 67 to point 76 on curve 73 is $a$; to point 77 on curved surface 74 is $b$; and to point 78 on the desired focal surface 71 is $d$; with the distance between point 77 and 78 being $c$. Points 76, 77 and 78 are all at the same distance, $h$, from axis A.

It is an object of the present invention to modify the acoustic path length as a function of the distance from the axis A so that the path length to focal surface 71 will be equivalent to the previous path length to focal surface 65 (FIG. 4).

Equating the acoustic path length and recalling that $D = n_w d_w$:

$$n_w d_w = n_w a + n_1(b-a) + n_2(d-b) \qquad (2)$$

where $n_w a$ is the acoustic path length to point 76; $n_1(b-a)$ the acoustic path length between points 76 and 77 in the first element; and $n_2(d-b)$ is the acoustic path length between points 77 and 78 in the second element of the focal surface modifier. Rearranging and solving for $b$:

$$b = \frac{n_w d_w}{n_1 - n_2} + \frac{(n_1 - n_w)a}{n_1 - n_2} - \frac{n_2 d}{n_1 - n_2} \qquad (3)$$

Figure 6:
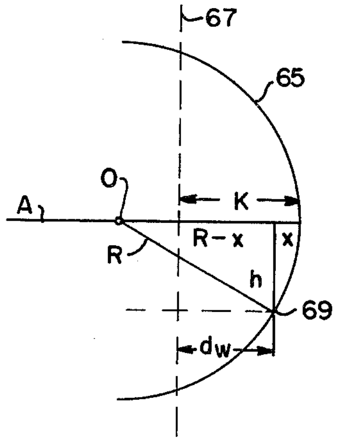
FIG. 6 illustrates various dimensions to aid in an understanding of certain equations herein.

The approximate equivalent for the distance $d_w$ in equation 3 will next be derived with additional reference to FIG. 6 which by way of example, illustrates the focal surface 65 as a portion of a sphere centered at point 0 and having a radius R. K is again the constant distance from the reference plane 67 to the focal surface 65 as measured along the lens axis A and the illustrated distance $x$ is a function of $h$, as is the distance $d_w$.

From the relationship of the legs of a right triangle:

$$R^2 = (R-x)^2 + h^2 \qquad (4)$$

$$R^2 = R^2 - 2Rx + x^2 + h^2 \qquad (5)$$

$$2Rx = h^2 + x^2 \qquad (6)$$

$h$ is greater than $x$, and $x^2$ is negligible with respect to $h^2$ so that:

$$X \cong \frac{h^2}{2R} \qquad (7)$$

For angles within a typical field of view and with typical values of $R$ the assumption that $x^2$ is approximately zero makes an error in $x$ of less than 2%.

From FIG. 6:

$$d_w = K - x \qquad (8)$$

substituting the value $x$ from equation 7:

$$d_w = K - \frac{h^2}{2R} \qquad (9)$$

substituting this for distance $d_w$ in equation 3 yields $$b = \frac{n_w K}{n_1 - n_2} - \frac{h^2 n_w}{(n_1 - n_2)2R} + \frac{(n_1 - n_w)a}{n_1 - n_2} - \frac{n_2 d}{n_1 - n_2} \qquad (10)$$

In equation 10, $n_w$ is the index of refraction of, in this case, water and is equal to 1. $n_1$ and $n_2$ are fixed numbers governed by the respective mediums. Accordingly, the first term on the right-hand side of equation 10 is a constant.

For ease of computation and manufacture, the front surface of the focal surface modifier may be made planar, that is surface 73 of FIG. 5 would be flat, as illustrated by the front surface 59 in FIG. 3. In such instance the distance $a$ would not vary as a function of $h$ but would be constant, and accordingly, the third term on the right-hand side of equation 10 would be a constant. If the focal surface 71 is chosen to be planar, the distance between reference plane 67 and surface 71 is a constant, and accordingly the fourth term on the right-hand side of equation 10 is also a constant. Lumping all of these constants together into a new constant C, equation 10 reduces to $$b = \frac{h^2}{(n_1 - n_2)2R} + C \qquad (11)$$

By way of example, element 54 of FIG. 3 may be fabricated of polystyrene having an index of refraction $n_1$ equal to 0.63. Element 55 may be a liquid known as dibromotetrafluoroethane having an index of refraction $n_2$ equal to 2.43. Inserting these values into equation 11 results in:

$$b = \frac{h^2}{2(1.8R)} + C \qquad (12)$$

which is similar in form to equation 9 and defines a spherical surface of radius of −1.8R centered on the axis at a location determined by solving equation 3 with distance values measured along the axis ($h = 0$).

In practice exact solutions to produce a desired shaped image plane would be determined with the aid of a ray tracing computer program. Such ray tracing programs are familiar to those skilled in the art and in general the value of the distance $a$ as a function of $h$ may be inserted as well as a value of $d$ as a function of $h$ so that this focal surface modifier may be designed to image not only onto a planar but to any other desired curvature. In such general cases surfaces 65, 73, 74 and 71 may be shapes other than spherical or planar although spherical and planar surfaces are easiest to manufacture.

The apparatus utilizes a material of acoustic index of refraction less than one in conjunction with a material of acoustic index of refraction greater than one. Such combination aides in reducing severe curvatures which may result in undesired reflections. This large change in $n$ at the interface of the two elements to reduce curvature is accomplished with the use of a solid and a liquid.

In general, the solid is a plastic polymer and may be chosen from the group including polystyrene, polyethylene and acrylic. The liquid may be chosen from the group of halogenated hydrocarbons. The dibromotetrafluorethane being one example. These fluids are inert with low electrical conductivity so that direct contact with the transducer array may be made. In order to reduce reflections from the interface the elements must be chosen to have specific acoustic impedances as closely matched as possible. For example, the specific acoustic impedance of polystyrene is $2.5 \times 10^5$ rayl while that of the dibromotetrafluorethane is $1.35 \times 10^5$ rayl. Element 54 is actually a physically machined or otherwise shaped piece of plastic, whereas element 55 is a liquid the shape of which is defined by the surface 57 of element 54. The side surfaces of element 55, if any, may be contained by a thin walled container while the planar surface of element 55 may be contained by the transducer array itself.

Figure 7:
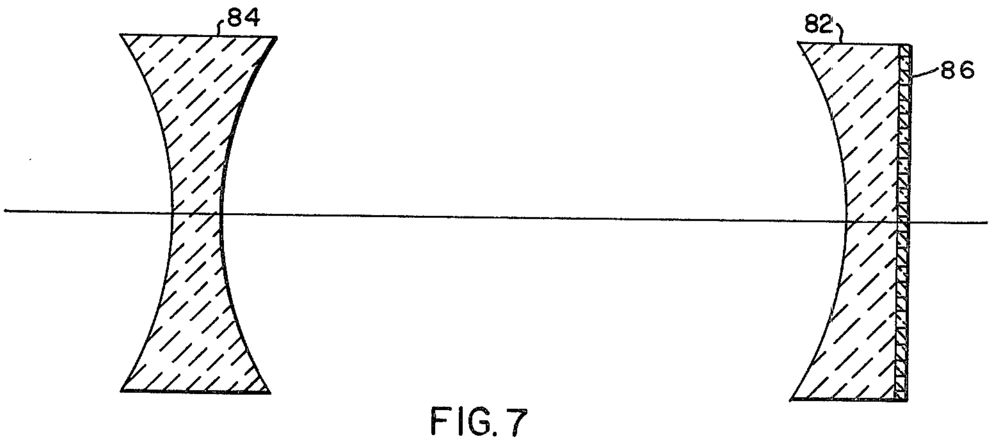
FIG. 7 illustrates an alternate embodiment of the present invention.

If just a single element modifier is desired, for example a polystyrene element, equation 11 may be solved by making $n_1$ be the equivalent of water while $n_2$ is 0.63. With these values inserted:

$$b = \frac{-h^2}{2(.37R)} + C \qquad (13)$$

which defines a spherical surface or radius 0.37R however with a curvature, opposite to the curvature previously calculated. Such an arrangement is illustrated by element 83 in FIG. 7 disposed between lens 84 and transducer array 86.

What is claimed is:

1. Acoustic lens apparatus comprising:

A. an acoustic lens normally operative to focus acoustic energy from points on an object surface onto a focal surface;

B. transducer means defining elemental transducers of an array;

C. a focal surface modifier including at least two adjacent elements having different indices of refraction disposed proximate said transducer array in the path of acoustic energy passing through said lens and operable to modify said focal surface to conform to a predetermined other surface shape;

D. said transducer array being positioned at said modified focal surface and having a shape to generally conform to said predetermined other surface shape.

2. Apparatus according to claim 1 wherein:

A. said predetermined other surface shape is planar.

3. Apparatus according to claim 1 wherein:

A. said focal surface modifier touches said transducer array.

4. Apparatus according to claim 1 wherein:

A. one of said elements is a liquid and the other is a solid.

5. Apparatus according to claim 4 wherein:

A. said liquid is a halogenated hydrocarbon and

B. said solid is a plastic polymer chosen from the group including polystyrene, polyethylene and acrylic.

6. Apparatus according to claim 1 wherein:

A. one of said elements has an index of refraction $>1$ and the other has an index of refraction $<1$.

7. Apparatus according to claim 1 wherein:

A. the specific acoustic impedances of said elements are such as to minimize acoustic reflection.

* * * * *